United States Patent [19]

Northway

[11] Patent Number: 5,707,599
[45] Date of Patent: Jan. 13, 1998

[54] PROCESS FOR PURIFYING TANTALUM OXIDE AND OTHER METAL OXIDES

[75] Inventor: Steven Northway, Corvallis, Oreg.

[73] Assignee: Santiam Electroactive Materials, Corvallis, Oreg.

[21] Appl. No.: 600,807

[22] Filed: Feb. 13, 1996

[51] Int. Cl.⁶ .......................... C01B 13/14; G01G 23/00; G01G 35/00; G01G 25/00
[52] U.S. Cl. .......................... 423/592; 423/608; 423/609; 423/610
[58] Field of Search .......................... 423/592, 608, 423/609, 610

[56] References Cited

U.S. PATENT DOCUMENTS

| | | | |
|---|---|---|---|
| 2,980,496 | 4/1961 | Mettler, Jr. | 423/592 |
| 3,000,703 | 9/1961 | Brugger | 423/608 |
| 3,133,788 | 5/1964 | Kern et al. | 423/592 |
| 4,668,501 | 5/1987 | Shibuta et al. | 423/608 |
| 4,741,894 | 5/1988 | Melas | 423/608 |
| 5,211,921 | 5/1993 | Sommers et al. | 423/592 |

FOREIGN PATENT DOCUMENTS

| | | | |
|---|---|---|---|
| 007060642 | 1/1983 | European Pat. Off. . | |
| 0241278 | 10/1987 | European Pat. Off. . | |
| 274141 | 12/1989 | German Dem. Rep. | 423/592 |
| 3904292 | 8/1990 | Germany . | |
| 51-10197 | 1/1976 | Japan | 423/592 |
| 58-99119 | 6/1983 | Japan | 423/592 |
| 891567 | 12/1981 | U.S.S.R. | 423/592 |
| 1197271 | 7/1970 | United Kingdom | 423/592 |

OTHER PUBLICATIONS

Brauer et al., Zeitschrift für Anorganische und Allgemeine Chemie, 348–298, 1966, no month.

*Primary Examiner*—Steven Bos
*Attorney, Agent, or Firm*—Jeffrey B. Oster

[57] ABSTRACT

There is disclosed a process for producing premium grades of metal oxide comprising (1) providing wet or dried hydrous metal oxide containing high levels (e.g., 2%–10% chloride) of halogen contamination, (2) treating the contaminated metal oxide with a base in gas phase, which base is volatile at $\leq 900°$ C., at a final temperature of between 750° C. to no greater than 900° C. wherein the temperature is brought to the final temperature in increments of about 25° C., until gas exiting shows no additional evolution of a halogen conjugated acid, and (3) exposing the treated metal oxide to air or oxygen at a temperature of 500° to 600° C. to convert any metal nitrides or oxynitrides present to metal oxide, wherein the metal oxide is selected from the group consisting of $Ta_2O_5$, niobium oxide, hafnium oxide, zirconium oxide and titanium oxide. The inventive process yields a premium grade, high active surface area $\beta$-$Ta_2O_5$ product with a chloride content that is below detection limits (e.g., $\leq 1$ ppm–0.2 ppm) and in which the contaminant metals levels are unchanged or diminished from the levels of the hydrous oxide starting material.

3 Claims, No Drawings

PROCESS FOR PURIFYING TANTALUM OXIDE AND OTHER METAL OXIDES

TECHNICAL FIELD OF THE INVENTION

The present invention provides a process for purifying tantalum oxide, particularly for dechlorinating or dehalogenating tantalum oxide and removing contaminating transition metals.

BACKGROUND OF THE INVENTION

There is an increasing demand for tantalum chemicals, and particularly $Ta_2O_5$ of very high purity (i.e., >99.99%) in the electronics and optoelectronics industries for fabrication of devices such as electrochromic displays, lithium tantalate, surface acoustic wave filters, electroluminescent phosphors, and other such devices. High purity $Ta_2O_5$ with very low transition metal impurity levels is desired in optical devices and glasses. For such applications, tantalum purities of 99.99% to 99.9999% are desired. Not only are very low metal level impurities required (i.e., <2 ppm), but halogens (fluoride and chloride) contents of less than 20 ppm are demanded (see, for example, DE-A39 04 292 and EP-A0 241 278)

Previous attempts to improve the purity of tantalum in general and $Ta_2O_5$ in particular have focused upon (1) diminishing the levels of metallic impurities or (2) diminishing the levels of halides, often the same halides that are introduced in the course of achieving a reduction of metallic impurities. Metallic impurities, particularly refractory metal contaminants such as molybdenum, tungsten and niobium, are generally removed by a solvent extraction or ion exchange process in concentrated fluoride media. This process yields high purity heptafluorotantalate salt. This salt must be stripped of fluoride in a difficult process considering that the final product must have less than 10 ppm halide levels. The process of stripping is usually by hydrolysis or solvolysis followed by high temperature calcination to convert the tantalum salt to $Ta_2O_5$. The foregoing methods require handling large quantities of very high purity, highly corrosive solvents carrying relative dilute tantalum solutions. This requires large expenditures for corrosion-resistant process equipment and a high risk for incidental and carryover contamination of the tantalum product by the large volume of process fluids.

Another procedure for removal of transition metals, such as iron, nickel and manganese, is fractional distillation of the chlorides under carefully controlled temperature and $E_h$ to separate a high purity $TaCl_5$ from the transition metal contaminants. This may be accomplished simultaneously or with or subsequent to a reactive conversion of an impure tantalum metal feed stock by a hot (350° C.) $Cl_2$ stream. This results in high purity $TaCl_5$ that must then be converted to $Ta_2O_5$ by hydrolysis or solvolysis and a subsequent high temperature calcination. Therefore, the common thread for removing metal contaminants from tantalum is conversion of high purity product tantalum halide to $Ta_2O_5$ with very low levels of residual halide.

Tantalum halide conversion typically involves direct hydrolysis or solvolysis with liquid water, steam, alcohol or aqueous ammonia and hydrogen peroxide to produce either hydrated tantalum oxides, tantalum alkoxides or peroxytantalates. The foregoing tantalum products retain high levels of halides and therefore require further treatment and thermal processing to yield an acceptable $Ta_2O_5$ product. Specifically, the peroxytantalate product is problematic because it is treacherously explosive and requires extreme care in handling, but it is a simple procedure to produce peroxytantalate with <1–5 ppm transition metals, <20 ppm $F^-$ and high particle surface activity due to low processing temperatures. The alkoxide route (described in EP-A0 251 432) yields a tantalum oxide product with a chloride content of ≦20 ppm but requires many days to carry out a two-stage reaction and involves extraordinary expenses in using and handling of >>10 times stoichiometric quantities of ultra-high purity solvents, requiring subsequent recovery, reprocessing or disposal or very large volumes of flammable hazardous waste.

There is a difficult and expensive process to dehalogenate $Ta_2O_5$ produced by liquid water or steam hydrolysis of $TaCl_5$. This process requires starting with an initial hydrolysis product containing 2–10% chloride and heating to ≈1200° C. for 1–4 hr's in a rotating furnace. This reaction yields copious hot HCl which is highly corrosive to process equipment and exacerbates $Ta_2O_5$ product contamination. This process creates a quantum increase in capital equipment expense and maintenance because of (1) difficulty with building corrosion-resistant equipment that can operate at high temperatures, (2) difficulty and expense of heating the feedstock to ≈1200° C (e.g., 1000° C. to 1050° C. is the upper useful temperature limit of a simple resistance-heated furnace employing Nichrome elements: fragile and expensive $MoSi_2$ resistance elements or other heating must be used above this temperature), (3) the high temperature produces a $Ta_2O_5$ product which is contracted and partially sintered to a "gritty" texture requiring extended subsequent milling, and (4) there occurs a partial phase transformation of $Ta_2O_5$ from a low temperature orthorhombic β phase to a quenched-in high temperature tetragonal α phase. One would prefer $Ta_{25}$ product that is a soft, powdery, high surface area material that is prepared at lower temperatures.

In view of the foregoing problems for producing a $Ta_2O_5$ product that is a soft, powdery, high surface area material at reasonable cost (due to processing conditions, hazardous waste generation and capital cost and maintenance of equipment), there is a need in the art to improve upon the current processes for generating high grade $Ta_2O_5$ product. The present invention was made to address the foregoing needs.

SUMMARY OF THE INVENTION

The present invention provides a process for producing premium grades of metal oxide comprising (1) providing wet or dried hydrous metal oxide containing high levels of (e.g., 2%–10% chloride) of halogen contamination, (2) treating the contaminated metal oxide with a base in gas phase, which base is volatile at ≦900° C., at a final temperature of between 750° C. to no greater than 900° C. until the gas exiting shows no additional evolution of a halogen conjugated acid, and (3) exposing the treated metal oxide to air or oxygen at a temperature of 500° to 600° C. to convert any metal nitrides or oxynitrides present to metal oxide, wherein the metal oxide is selected from the group consisting of $Ta_2O_5$, niobium oxide, hafnium oxide, zirconium oxide and titanium oxide. Preferably, the halogen is chloride, fluoride, bromine or iodine. The inventive process yields a premium grade, high active surface area β-$Ta_2O_5$ product with a chloride content that is below detection limits (e.g., ≦1 ppm–0.2 ppm) and in which the contaminant metals levels are unchanged or diminished from the levels of the hydrous oxide starting material. Preferably, the base is selected from the group consisting of ammonia, water, hydrazine and combinations thereof. Most preferably, the base is ammonia or hydrazine, or a combination thereof. The inventive further removes transition metal contaminants such as iron, chromium, vanadium, nickel and manganese from the tantalum oxide starting material.

DETAILED DESCRIPTION OF THE INVENTION

The present invention provides a process for producing premium grades of metal oxide comprising (1) providing wet or dried hydrous metal oxide containing high levels (e.g., 2%–10% chloride) of halogen contamination, (2) treating the contaminated metal oxide with a base in gas phase, which base is volatile at ≦900° C., at a preferred final temperature of between 750° C. to no greater than 900° C. until the gas exiting the reaction chamber shows no further evolution of traces of the halogen conjugate acid, and (3) exposing the treated metal oxide to air or oxygen at a preferred temperature of 500°to 600° C. (most preferably 550° C.) to convert any metal nitrides or oxynitrides present to metal oxide, wherein the metal oxide is selected from the group consisting of $Ta_2O_5$, niobium oxide, hafnium oxide, zirconium oxide and titanium oxide. It should be noted that the temperature range in step (3) is from a low of 250° C. to a high calcine temperature of 1100° C. when it is necessary that all traces of water must be removed. Moreover the time for step (3) is sufficient to remove objectionable traces of nitrogen or residual water as determined by subsequent analysis. For example, for step (3), 4 hours at 550° C. was found to be adequate for removing nitrogen from a 2 cm deep flowover static bed of partially nitrided $Ta_2O_5$. Preferably, the halogen is chloride, fluoride, bromine or iodine. The inventive process yields a premium grade, high active surface area β-$Ta_2O_5$product with a chloride content that is below detection limits (e.g., ≦1 ppm–0.2 ppm) and in which the contaminant metals levels are unchanged or diminished from the levels of the hydrous oxide starting material. Preferably, the base is selected from the group consisting of ammonia, water, hydrazine and combinations thereof. Most preferably, the base is ammonia or hydrazine, or a combination thereof. The inventive further removes transition metal contaminants such as iron, chromium, vanadium, nickel and manganese from the tantalum oxide starting material.

Step (2) treats the contaminated metal oxide with a base in gas phase, which base is volatile at ≦900° C., at a final temperature of between 750° C. to no greater than 900° C. until the gas exiting the reaction chamber shows no further evolution of traces of halogen conjugate acid, for example, $NH_4Cl$ when $NH_3$ is the base or HCl when $H_2O$ is the base, when the temperature of a $Ta_2O_5$ batch in process is stepped up by ≈25° C. increments. This diffusionally controlled process time can be as short as 30 sec for a finely divided $Ta_2O_5$ in a highly swept preheated fluidized bed reactor, and has been observed to be >60 hours in a static, 5 cm deep simple flowover bed. No deleterious effects on the final $Ta_2O_5$ product quality have been observed from prolonging the step (2) gaseous base wash treatment beyond the amount of time necessary to remove the last traces of halide from the $Ta_2O_5$, though when $NH_3$ is the base increased conversion of the $Ta_2O_5$ to TaON (as evidence by an olive-green color in the $Ta_2O_5$) occurs. Similarly, the minimum process temperature is dependent on diffusional kinetics as well as thermodynamics. Evolution of some HCl from loosely bound chloride can be noted when the wet or dry $Ta_2O_5$ hydrate is treated with water at 20° C., but useful and copious evolution of HCl (or $NH_4Cl$) is noted only above ≈300°–400° C. The maximum final temperature is limited to ≦900° C. by the desire, in the specific case with $NH_3$ as the base, to avoid thermal dissociation of $NH_3$ to a hot flammable mixture of $H_2$ and $N_2$ that could explode upon leaking into the air or upon air leaking into the reaction chamber, and in the general case to prevent sintering and "hardening" of the $Ta_2O_5$ product and to avoid reaction of the hot $Ta_2O_5$ with fused quartz vessels and furnace hardware.

The inventive process provides an inexpensive process for complete dechlorination of tantalum feedstocks derived from $TaCl_5$. The inventive process, thereby provides the means for inexpensively converting underutilized secondary tantalum and tantalum scrap from the electronic capacitor industry to produce premium grade $Ta_2O_5$. This tantalum metal scrap enters the circuit as tantalum metal powder of the lowest commercially available niobium content, which is necessary to minimize function-limiting capacitor leakage currents (niobium is a deleterious contaminant metal which cannot be readily removed from $TaCl_5$ by fractional sublimation). This low-niobium tantalum metal becomes incidentally contaminated during its manufacturing process with iron, manganese, calcium, vanadium, nickel, chromium, and the like which are also deleterious contaminant metals in premium grade $Ta_2O_5$, but can be readily removed inexpensively by fractional sublimation. Fractional sublimation may be carried out concurrently with or subsequent to conversion of secondary tantalum metal to $TaCl_5$ by reacting the metal with a stream of $Cl_2$ in which the ignition temperature of the self-sustaining exothermic reaction is ≦350° C. The abundance of this medium-grade secondary tantalum on the scrap market has driven its price down to about $10 per pound, whereas the value of premium grade $Ta_2O_5$ is greater than $250 per pound. It is estimated that the inventive process provides a conversion cost of about $20 per pound, leaving a substantial profit.

The inventive process further eliminates the need for expensive environmental mitigation and disposal of fluoride raffinates which can result from tantalum purification in other processes. Excess ammonia, which may escape conversion to water and $N_2$ in the course of the reaction is easily scrubbed from the discharge gases and recycled or disposed of as an agricultural byproduct. Further, the inventive process uses lower temperatures which save energy costs. It should be noted that at temperatures above 900° C., $Ta_2O_5$ reacts with fused quartz, resulting in heavy contamination of the $Ta_2O_5$ with Si. This is why conventional thermal processing of $Ta_2O_5$, done at the elevated temperatures of 1000° C. to 1250° C. necessary to diminish the halide content to less than 10 ppm is done in vessels of $Al_2O_3$, platinum, α-stabilized $ZrO_2$, or $Ta_2O_5$ coated refractory materials. At the temperatures used in the inventive process, reaction of $Ta_2O_5$ and consequential Si contamination of $Ta_2O_5$ is much less and therefore relatively inexpensive and easily fabricated fused quartz may be employed for both structural and containment applications.

Example 1

This example illustrates an experiment with simple air treatment to lower the chlorine content of $Ta_2O_5$. $TaCl_5$ was obtained from tantalum capacitor sintering rejects which were burned in a chlorine atmosphere within a high-purity graphite reaction vessel. The $TaCl_5$ was added, with vigorous stirring, to a large excess of deionized water and the resulting flocculent suspension was filtered to produce a slimy, low-density off-white cake. This hydrated tantalum oxychloride was resuspended in hot distilled water at a ratio of 150 g of wet hydrated tantalum oxychloride to 1000 ml of distilled water. This suspension was covered and heated with stirring at 95°–100° C. for 100 hours to attempt to convert the hydroxy form of the hydrated tantalum to the oxalato-form with concomitant rejection of covalently bonded chloride from the tantalum-oxygen-hydrogen molecular framework. This was somewhat successful since within the first one half to one hour interval following heating and stirring, the material changed from a milky unsettleable suspension to a relatively solid white material that settled out to a high density layer a few seconds after stirring was stopped. At the end of 100 hours the heating was terminated and the product allowed to cool to room temperature.

The white, dense precipitate was filtered through 8 μm and then 2.7 μm filter paper. The resulting clear, colorless filtrate had a pH of about 1.5 and contained less than 1 ppm of dissolved tantalum. The wet filter cake was chalky, brittle, non-adherent and white. This filter cake was dried at 105° C. for 10 hours under a flow of dry air and the final weight of the dried material was 41.43% of the wet chalky filter cake.

9.58 g of the wet chalky filter cake, previously dried at 105° C., was loaded into a fused quartz combustion boat and placed in a 2 inch diameter fused quartz combustion tube through which dry air flowed at a rate of about 2–3 liters per minute. The tube and its contents were heated in a stepwise manner to achieve a temperature elevation of about 25° C. per hour up to 390° C., after which the rate of temperature increase was decreased to 10° C. per hour until 500° C. was reached. The temperature was raised further at a rate of 100° C. per hour in 50° C. steps until 810° C. was reached, at which point the sample was held at 810° C. for 10 hours with a continued flow of dry air. The final weight of the sample was 3.7031 g, the 810° C. dried weight being a 38.65% recovery based on the weight of the wet filter cake. The material was a bright white soft powder.

The chlorine content of the starting material dried at 105° C. was 17,000 ppm. The chlorine content of the material calcined in air at 810° C. in this example was 400 ppm. Therefore simple thermal air treatment of the $TaCl_5$ hydrolyzate did not result in an acceptable low-chloride product.

Example 2

This example describes an experiment to evaluate another method to reduce the chloride content of a metal oxide. Hydrated tantalum oxychloride was obtained from the same filter cake as in example 1. 8.048 g of the wet chalky filter cake was loaded into the fused quartz combustion boat and then placed in the fused quartz combustion tube as in example 1 through which dry air flowed at 2–3 liters per minute and the temperature was held at 105° C. The temperature and air flow were maintained for 10 hours to produce a dried sample weight of 3.3495 g, which represented a dried weight recovery of 41.62%.

2.4594 g of the dried material was left in the quartz combustion boat and the air in the tube replaced by a mixed flow of argon, at about 2 liters per minute, and ammonia at about 200 ml per minute. The argon served both to act as a mass transport carrier for the reaction-quelling water produced by the reaction between ammonia and $Ta_2O_5$ at higher temperatures (10 $NH_3+3Ta_2O_5 \rightarrow 2Ta_3N_5+15H_2O$), and to dilute down to below combustible concentrations any $H_2$ produced by thermal dissociation of ammonia (2 $NH_3 \rightarrow 3H_2+N_2$) at high temperature. The relatively high flow rate of Ar carrier also assisted in thermal "washing" of the evolved $NH_4Cl$ downstream preceding diagnostic observations of possible new $NH_4Cl$ evolution. The temperature was raised stepwise by 25° C. increments at an initial rate of about 50° C. per hour. When evolution of $NH_4Cl$ commenced, as evidenced by condensation of $NH_4Cl$ "frost" on the cooler internal wall of the downstream portion of the quartz combustion tube emergent from the tube furnace, the heating rate was arrested and the temperature held constant until all evolution of $NH_4Cl$ at that temperature ceased. This often required an hour or more at each incremental 25° C. step. While $NH_4Cl$ evolution was first noticed at 350° C. (the sublimation temperature of free $NH_4Cl$ is about 340° C.), each newly equilibrated incremental temperature resulted in a strong fresh flush of $NH_4Cl$ evolution. The densest $NH_4Cl$ evolutions occurred during the steps between 400° C. and 450° C., well above the normal sublimation temperature of $NH_4Cl$ and $NH_4Cl$ evolution continued to above 600° C. The final evaporatively equilibrated step at which any new $NH_4Cl$ evolution was barely perceptible was at 750°–775° C. These results show that the $Cl^-$ of $NH_4Cl$ moieties are chemically, rather than physically bound to $Ta_2O_5$ substrate, since energies well above those required to evaporate $NH_4Cl$ at its normal boiling point were needed to dissociate the bound $NH_4Cl$ from the $Ta_2O_5$ before it could evaporate away.

The final temperature of the sample was maintained at 810° C. for 8 hours with the same mixed gas flow as noted above. The sample was allowed to cool in the furnace overnight under a flow of argon. The cooled sample displayed a bright array of colors possibly due to a partial conversion of the $Ta_2O_5$ to TaON or $Ta_3N_5$ by the $NH_3$ stream (Brauer et at., *Zeitschrift für* Anorganische und Allgemine Chemie 348:298–308, 1966). The weight of the colored sample was 2.2582 g, which represents 38.29% recovery of the material based on the wet filter cake weight.

The initial chloride content of the starting material was again 17,000 ppm Cl in the 105° C. dried filter cake. This process resulted in a significant reduction in the chloride content of the material treated at 810° C. with ammonia with the chloride level being below the detection limit of 10 ppm Cl.

Exactly 0.1597 g of the colored material above was returned to the fused quartz combustion boat and reinserted into the fused quartz combustion tube. The temperature was rapidly brought to 810° C. under a stream of dry air and held there for 4 hours. The material was allowed to cool down in the furnace overnight. The material was now bright white, had remained soft and powdery and had a final calcined weight of 0.1636 g (a 2.4% weight gain). This white, calcined $Ta_2O_5$ converted from the colored material also possessed a chloride level below the analytic limit of detection at 10 ppm Cl.

Example 3

This example reports an experiment to test a prototype production-scale run undertaken with a 50 gallon glass-lined jacketed reactor for the $TaCl_5$ hydrolysis stage and a 6 inch inner diameter quartz tube for the tube furnace liner in the dechlorination stage. As in examples 1 and 2, hydrous tantalum oxychloride starting material was produced by adding $TaCl_5$, derived from chlorinating tantalum capacitor slugs in a large excess of deionized water with vigorous stirring. The slimy hydrous material was filtered by centrifugation against a filter cloth and similarly washed with deionized water. About 4 kg of the filtered material was resuspended with vigorous stirring in about 50 gallons of hot deionized water contained in the glass-lined reactor to convert the material to the oxalato-form. The temperature of the stirred suspension in the reactor was maintained at 90° C. to 95° C. for 10 hours by circulating hot oil in the reactor jacket. The suspension was now densified and was filtered by centrifugation and then washed with deionized water. This material was a grayish off-white and it contained some black flecks.

Two thousand twenty grams of this hydrous oxalato-tantalum oxychloride was loaded into a porous $Al_2O_3$ boat about 4.5 inches wide and about 23 inches long wherein the material was loaded in the boat as lumps about 1–3 cm in diameter so as to maintain an open, macroscopically porous secondary structure permitting free exchange of gases. The total bed depth was about 6–7 cm. The loaded $Al_2O_3$ boat was slid into the center of the fused quartz tube which had been placed in a tube furnace. The material was dried under a flow of dry air of 8 liters per minute at 105° C. to 130° C. for 30 hours with the noticeable evolution of water vapor ending in 16 hours. The product underwent a 20–30% volume reduction upon drying and remained powdery but it still maintained the lumpy secondary structure, and the pH of the final increments of $H_2O$ condensate collected at the end of the drying process was 5.0–6.0. The dried contents of the boat weighed 740 g providing a dry weight yield of 36.63% based upon the wet cake.

The boat and its contents were returned to the furnace and the gas flow was adjusted to 5.5 liters per minute of Ar and 0.4 liters per minute of ammonia. The temperature was raised stepwise in 100° C. steps at 100° C. per hour. When noticeable $NH_4Cl$ evolution began at about 350° C., the $NH_3$ flow was increased to 1 liter per minute. The last newly evolved $NH_4Cl$ was observed at the 750° C. step, at which time the gas consumption was changed to 5 liters per minute of Ar and 2.1 liters per minute of ammonia. The final temperature was 850° C. and was held at that temperature and those gas flow rates for 10 hours, after which time the furnace power was turned off but the mixed gas flows maintained for another 9 hours or until the indicated furnace temperature had fallen to 100° C. At that time the ammonia gas flow was stopped, but the Ar flow was maintained for another 12 hours until the charge was at ambient temperature. The color of the cooled tantalum-oxide-nitride mixture in the boat varied from a bright brick red at the charge surfaces at the upstream gas entry end of the boat through dull olive green through salmon-ochre through dusky off-white at the centers of the most deeply buried lumps. The weight of the charge after the ammonia reaction was 590 g, giving a 29.21% weight recovery based upon the wet filter cake. The ammonia and thermal treatment between 105° C. and 850° C. had caused a weight loss of the 105° C. dried tantalum oxychloride of 20.3%. The material remained soft and powdery (while maintaining the lumpy secondary structure) and did not display a highly conspicuous change in volume. The charge in the boat was sampled at three apparently different composition regions, (1) the olive green material comprising the bulk of the near-surface region of the charge, (2) the salmon-ochre colored zone lying deeper in the lumps and general bed of the charge, and (3) the "dirty" off-white colored material comprising the most inaccessible zones at the interiors of the largest lumps and the bottom of the downstream end of the bed. The chloride contents of the three regions were, respectively, (1) 3 ppm, (2) 7 ppm, and (3) 60 ppm chloride.

The boat's remaining undisturbed 577 g of the charge, which still retained its lumpy secondary structure, was replaced in the tube and furnace. The furnace was flushed with Ar at a flow of 6 liters per minute while warming the contents over 2.5 hours to 150° C. The Ar flow rate was reduced to 4 liters per minute and 0.5 liters per minute of ammonia was added to the gas stream. With this gas flow rate and composition, the temperature was raised stepwise in 100° C. increments at a rate of 200° C. per hour until a temperature of 750° C. was reached. The gas flow was changed to 2 liters per minute of Ar and 3 liters per minute of ammonia. The temperature was raised to 880° C. and then held there for 12 hours. During this time at 880° C. water was discharged continuously into the previously dried tailstream by the reaction of ammonia with the $Ta_2O_5$ in the charge (10 $NH_3+3Ta_2O_5 \rightarrow 2Ta_3N_5+15H_2O$). After the 12 hour at 880° C. hold, the power to the furnace was turned off and the gas flow changed to 3 liters per minute of Ar only and the charge and furnace were allowed to cool over the next 24 hours.

The bed of tantalum product in the boat was now largely converted to orange-yellow and olive-green materials with very little "dirty" off-white material in the center of the largest and most compact lumps. I used a different chloride analytical method, called hot hydrolytic desorption (TOX), to improve sensitivity. I applyied this technique to the materials resulting from this second $Ta_2O_5$ ammonia treatment, (1) the orange-yellow material from the top surface of the upstream edge of the charge's bed, (2) the olive-green to brownish material from the center of the bed and the interiors of the lumps, and (3) the "dirty" gray material from the bottom of the bed and the very center of the most compact lumps, resulted in chloride determinations of ≦1 ppm for each of the three samples.

The boat and the remaining approximate half of the charge (246 g) were returned to the furnace and an air flow of 4 liters per minute commenced. The furnace was heated quickly to about 600° C. At 750° C. the surface of the charge displayed visible bright orange incandescence which could be modulated by admixture of oxygen to the air flow. When the incandescence had ceased in about 20 minutes, pure oxygen was blended into the gas stream at 3 liters per minute and the air was stopped so that the combustion tube was occupied by pure oxygen gas. The furnace temperature was brought to 850° C. and held there for 3 hours. The furnace power was turned off and the furnace and charge were allowed to cool to ambient temperature over 24 hours.

The oxygen-calcined $Ta_2O_5$ charge in the boat weighed 264 g and was a bright pure white with no evidence of the black flecks that were in the starting material. The powder was as soft and friable as that which was produced at smaller scale in the previous examples. The chloride was below the limit of detection or ≦1 ppm as determined by TOX. The nitrogen content was also below the Kejeldal detection limit of ≦15 ppm N. X-Ray diffraction of the powder confirmed that it was entirely orthorhombic $\beta$-$Ta_2O_5$.

I claim:

1. A process for purifying a highly contaminated metal oxide comprising (1) providing wet or dried hydrous metal oxide contaminated with halogen in a heating furnace having a gas exit port, (2) heating the contaminated metal oxide with a base in gas phase, wherein the base is ammonia or hydrazine or a combination thereof, to a final temperature of between 750° C. to no greater than 900° C. wherein the temperature is raised to the final temperature in increments of about 25° C., until gas exiting at the gas exit port shows no evolution of a halogen conjugated acid, and (3) exposing the heated metal oxide to air or oxygen at a temperature of 500° to 600° C., wherein the metal oxide is selected from the group consisting of $Ta_2O_5$, niobium oxide, hafnium oxide, zirconium oxide and titanium oxide.

2. The process of claim 1 wherein the halogen is chloride, fluoride, bromine or iodine.

3. The process of claim 1 wherein the metal oxide is $Ta_2O_5$.

* * * * *